United States Patent [19]
Leas et al.

[11] 3,985,548
[45] Oct. 12, 1976

[54] DIRECT METAL REDUCTION FROM COAL

[75] Inventors: Lawrence Earl Leas, Simi, Calif.;
Robert Lamar Leas; Arnold Marcel
Leas, both of Columbia City, Ind.

[73] Assignee: Leas Brothers Development
Corporation, Columbia City, Ind.

[22] Filed: May 30, 1972

[21] Appl. No.: 257,738

[52] U.S. Cl. .................................. 75/36; 208/8
[51] Int. Cl. .................................. C21b 13/02
[58] Field of Search ............... 75/4, 33, 34, 35, 36, 75/90, 91, 42, 4, 33–36, 26; 208/8

[56] References Cited
UNITED STATES PATENTS

| | | | |
|---|---|---|---|
| 171,812 | 1/1876 | Hunter | 75/34 |
| 981,280 | 1/1911 | Jones | 75/34 |
| 1,755,845 | 4/1930 | Snyder | 75/42 X |
| 2,760,855 | 8/1956 | Barking et al. | 75/4 |
| 2,835,557 | 5/1958 | West et al. | 75/26 X |
| 2,932,563 | 4/1960 | von Haken | 75/26 |
| 3,196,002 | 7/1965 | Stookey | 75/42 X |
| 3,231,367 | 1/1966 | Strassburger et al. | 75/42 X |
| 3,425,824 | 2/1969 | Heitmann | 75/36 X |
| 3,427,013 | 2/1969 | Cavanagh | 75/90 R |
| 3,469,969 | 9/1969 | Schenck et al. | 75/35 X |
| 3,635,456 | 1/1972 | Anthes et al. | 75/34 X |

Primary Examiner—L. Dewayne Rutledge
Assistant Examiner—M. J. Andrews
Attorney, Agent, or Firm—Edward E. Dyson; John J. Byrne

[57] ABSTRACT

A process for continuously and simultaneously extracting liquids from coal, gasifying the carbon to carbon monoxide and utilizing the carbon monoxide for the direct reduction of iron ore. The process is carried out by continuously conveying a mixture of iron ore, coal and oil in a moving solids bed through a single reactor tower, divided into a plurality of contiguous, communicating treatment zones.

7 Claims, 1 Drawing Figure

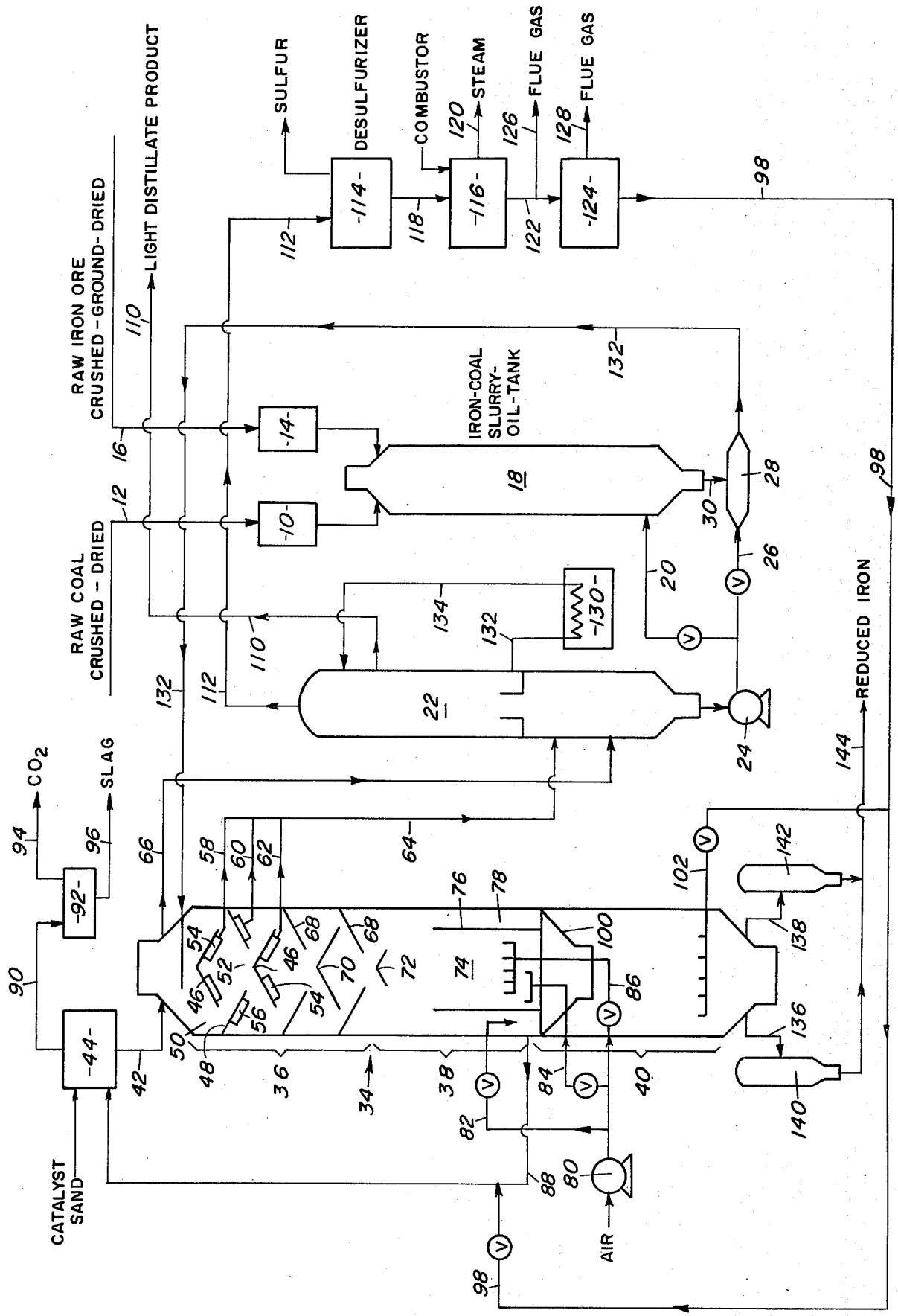

DIRECT METAL REDUCTION FROM COAL

This invention relates to the simultaneous and continuous extraction of liquid and gaseous products from coal and the use of the gaseous products to reduce iron ore. The process of this invention is related to the process disclosed in our copending application, Ser. No. 236,643 filed Mar. 21, 1972, entitled PRODUCTION OF DESULFURIZING GASES FROM COAL now U.S. Pat. No. 377,983. In the process of that application, a slurry is formed from crushed coal and oil and is introduced to a three-zone reactor along with a hydrocracking catalyst and a conveying medium such as sand. In the first or top zone, coal liquids are extracted and conveyed to a fractionation unit. In the second zone, the carbon coked on the solids is gasified with air creating a producer gas which flows upwardly countercurrent to the downward flow of the aforementioned mixture. The gases supply heat to the extraction phase. In the third stage, any remaining carbon is gasified with oxygen and carbon dioxide to a substantially nitrogen-free carbon monoxide. The carbon monoxide is then desulfurized in a metal oxide bed preferably cobalt oxide.

In the process of this invention, iron ore is introduced along with the coal slurry and along with the catalyst and conveying medium and is reduced by means of the carbon monoxide produced in the second and third stages in the reactor tower.

Therefore, it is an objective of this invention to provide an integrated process for simultaneously and continuously extracting liquid and gaseous products from coal, and using the gaseous products within the same reactor tower to simultaneously and continuously reduce iron ore.

It is a further objective of this invention to provide a process for efficiently utilizing one of our most abundant natural resources, coal, at a time when our domestic levels of petroleum crude oil are reaching the critical stage. There has been a reluctance to use coal as a fuel source because it contains substantial pollutants, primarily in the form of sulfur, requiring the end products to be desulfurized prior to consumption. The process of this invention utilizes highly efficient, economical and easily maintainable desulfurizing means in the form of metal oxide beds, preferably cobalt oxide.

It is a further objective of this invention to provide a relatively simple and economically feasible process for siumltaneously recovering liquid and gaseous fuels from coal and simultaneously the gaseous products to directly reduce iron ore simultaneously and continuously in the same reactor tower.

It is a further objective of this invention to provide an integrated process for the recovery of liquid and gaseous fuels from coal wherein the catalyst used in the hydrocracking stage is continuously regenerated and recycled for further use.

It is a further objective of this invention to utilize sand, metallurgical slag and the like as a conveying medium. The sand is mixed with the coal and catalyst and assists in propelling the coal particles downwardly through the vertically stacked zones in the reactor tower. This particular feature is related to the process disclosed in U.S. Pat. No. 3,617,464, dated Nov. 2, 1971, entitled COAL EXTRACTION METHODS AND APPARATUS.

More specifically, in the process of this invention raw iron ore is crushed and dried, raw coal is crushed and dried and both the iron ore and coal are "locked binned" as a mixture into a slurry-oil tank. Recycled oil is used to entrain and pump the combined slurry into the top of a reactor tower which is vertically divided into three contiguous zones. Positioned in the first zone is a series of vertically stacked convex and concave baffles defining alternating annular and central passageways, such that the mixture flowing downthrough the first zone is caused to follow a sineous path. Introduced along with the slurry is a conveying medium such as metallurgical slag or the like. Coal liquid is extracted and filtered in the first zone and is taken off via collection chambers disposed beneath the surfaces of the conical baffles and sent to a fractionation unit. Extracted residual heavy hydrocarbons are coked and the iron ore is chemically restructured. The restructuring of the gangue in the iron ore takes place when the tar acids and tar bases decompose, the sulfur gases and water vapor and other corrosive elements attach the iron ore. The solid mixture flows from the first zone to the middle zone which contains a cylindrical inner vessel defining concentric central and outer annular chambers. The carbon in the particles is gasified to carbon monoxide by hot air introduced into the middle zone. The carbon monoxide and/or carbon in turn reduces the iron ore. The resulting hot gases, including carbon dioxide, carbon monoxide and nitrogen, pass upwardly through the top zone to supply heat thereto. In the middle zone, the inward rush of air fluidizes the lighter slag particles out of the iron which particles settle in the above-mentioned outer annular chamber to be taken off and disposed of. The heavier iron, now substantially reduced, is collected in the central chamber and then dispensed through a funnel to the bottom zone wherein carbon dioxide and carbon monoxide are introduced to react with any remaining coke on the iron ore to form carbon monoxide which then substantially completely reduces the iron ore. The resulting gases including carbon monoxide flow upwardly through the middle and top zones. The successful desulfurization is primarily a result of the complete desulfurization of the residual carbon with the iron reduction, reoxidation and final reduction removing most of the sulfur from iron product. Further, in the bottom zone, the smaller iron particles become larger particles as sintering takes place thereby yielding a bottom product which is substantially pure iron pellet ready for use in a steel-making process.

These and other objects of the invention will become more apparent to those skilled in the art by reference to the following detailed description when viewed in light of the accompanying drawings wherein:

The single FIGURE diagrammatically illustrates the process of this invention.

Referring now to the drawings wherein like numerals indicate like parts, raw coal crushed and dried is introduced to lock bin 10 via line 12. Crushed and dried raw iron ore is introduced to lock bin 14 via line 16. The lock bins operate in a conventional manner to dispense selected amounts of the crushed materials into a slurry tank 18 where oil is introduced via line 20 to form an iron-coal-oil slurry. The oil is shown being introduced as recycled oil from a fractionator as will be explained more fully hereinafter. However, it is to be understood that a separate source may be employed. A pump 24 takes oil from the fractionator 22 and pressures it through line 26 with a portion being taken off via line 20 for direct introduction to the slurry tank 18. The oil in line 26 flows through an eductor 28 to entrain the slurry from tank 18. The slurry is introduced to the top of the reactor tower generally indicated by the numeral 34 via line 132.

The reactor tower 34 is generally divided into three zones, a top zone 36, a middle zone 38 and a bottom zone 40. Catalyst, sand, and recycled slag are introduced to the top of the reactor tower via line 42 from container 44. The slurry, catalyst and sand mixture flows downwardly through the first section 36 and contacts vertically disposed alternating convex and concave baffles 46 and 48 respectively. The baffles 46 define annular passageways 50 with the side walls of the reactor while the alternating concave baffles 48 define a central passageway 52. Hence the solid moving bed is forced to follow a sineous path as it flows over the baffles. It is in this area that liquids are extracted from the coal and are collected in annular chambers 54 and 56 on the underside of baffles 46 and 48 respectively. The surfaces of the baffles in the areas of the chambers are perforated to permit liquid to flow into the draw off lines 58, 60 and 62. Liquid from the chambers is then taken off via manifold line 64 for introduction to the fractionator 22. The overhead gases are taken off from the reactor via line 66 and introduced to the fractionator 22.

As the coal-iron mixture flows downwardly, a good portion of the iron contacts a second set of alternately concave and convex baffles 68 and 70 defining central and annular passageways respectively. Hence, the mixture continues to follow a sineous path. In this area, a good portion of the iron ore is reduced by being contacted with carbon monoxide gases generated in the middle zone as will be explained more fully hereinafter.

The mixture continues downwardly and contacts a centrally disposed baffle 72 whereby the solids are distributed to a central chamber 74 defined by inner cylindrical vessel 76. An outer annular chamber 78 is defined between the sidewalls of the inner vessel 76 and the reactor 34. Air is compressed in compressor 80 and pumped into the central chamber 74 and annular chamber 78 via lines 82, 84 and 86. The air gasifies the carbon in the solids to produce gases containing substantially carbon monoxide and nitrogen. Eventually, the carbon monoxide flows upwardly and countercurrent to the downward flow of the moving solid bed and reduces the iron ore in the area of the baffles 68 and 70. The upward rush of compressed air introduced via lines 84 and 86 tends to fluidize out those lighter particles of slag forcing them against the underside of the baffles 72 and into the annular chamber 78. The slag is taken off via line 88 and introduced into the container 44. The heaviest particles of the separated-out slag are reintroduced to the top of the reactor tower via line 42, while the lighter particles are separated out and introduced to cyclone separator 92 via line 90. Carbon dioxide and slag are taken from the separator 92 via line 94 and line 96 respectively. The carbon dioxide is introduced to the slag via line 98 for purposes of gas-lifting the slag through line 88 to the container 44. The source of the carbon dioxide will be discussed more fully below.

In the middle zone and more particularly in the central chamber 74, the carbon is gasified to carbon monoxide for reducing the iron ore and for supplying heat to the first zone. The iron ore is further chemically restructured in the middle zone and is collected in the central chamber and dispensed to the bottom zone 40 through funnel 100. At this stage there is still sufficient coke remaining to continue iron sintering and reduction in the bottom zone wherein carbon dioxide is introduced via line 102 and gasifies the residual carbon to produce carbon dioxide which in turn substantially completely reduces the iron ore. The effluent gases of carbon monoxide flow into the middle reactor and then into the upper section. The smaller iron particles become larger particles as sintering takes place thereby yielding a product of substantially pure iron pellets ready for a steel-making process.

Turning now to the fractionator 22, light distillate products are taken off via line 110 for storage and further processing. The lean gases are taken off the top of the fractionator via line 112 and conveyed to a sulfur removal station 114 for desulfurization. An example of a desulfurization unit that can be employed in this invention is a metal oxide bed, such as cobalt oxide in its higher oxide form. The sulfur and the gases fed to the bed form cobalt sulfide while the cobalt oxide is reduced to a metal or lower oxide form. The bed is regenerated by the introduction of air to oxidize the cobalt back to its higher oxide form and to liberate the sulfur as sulfur dioxide. In practice it is best to employ two beds to be used alternately in order to render the process continuous.

The desulfurized gases are introduced to a combustor 116 via line 118, and is combusted therein to produce a steam product which is taken off via line 120. Exhaust gases are taken off via line 122 and a portion thereof is introduced to carbon dioxide separator 124 while the remainder is taken off via line 126. Carbon dioxide is separated from the gases in the separator 124 and is introduced to the bottom section of the reactor via line 102. The remaining gases are taken off via line 128. If desired, a portion of the heat can be recovered from the fractionator by cycling some of the distillates through a heat exchanger 130 via line 132 and line 134.

A portion of the carbon dioxide from line 102 is taken off via line 98 and introduced to the line 88 to assist in elevating the separated out slag particles to the container 44 as mentioned earlier.

The sintered, substantially completely reduced iron is taken off from the bottom section of the reactor via line 136 and 138 to dispensing lock bins 140 and 142 respectively. The reduced iron is then conveyed via line 144 for further processing, such as in a steel making process.

Basically, the process of the invention is a low temperature, direct-iron-reduction process which not only removes the oxygen from the iron ore but also entrains most of the slag associated therewith even when using raw coal as a fuel. In addition, a valuable desulfurized distillate product is produced from the coal. Coal tar acids and bases and sulfur gases react chemically with the iron ore to facilitate slag separation by gas fluidization.

The process of this invention can be more fully understood with reference to the following examples:

EXAMPLE 1

One hundred pounds of iron ore with a 19.8 per cent by weight of iron and 100 pounds of raw coal were crushed, dried and slurry-oiled into the iron-coal reactor to yield an iron product with a 88.5 per cent by weight of iron and with a coal distillate yield of 32.5 per cent by weight of the coal feed. During the operation 86 per cent of the sulfur was removed from the combined coal and iron feed and 95 per cent of the slag was removed.

EXAMPLE II

One hundred pounds of iron ore with a 24.7 per cent by weight of iron and 100 pounds of raw coal were crushed, dried, and slurried into the iron-coal reactor to yield an iron product with 91.7 per cent by weight of iron and with a coal distillate yield of 29.4 per cent by weight of the coal feed. During the operation 89.6 per cent of the sulfur was removed from the combined coal and iron feed and 92.8 per cent of the slag was removed.

In the above examples the operating conditions were as follows:

|  | EXAMPLE I | EXAMPLE II |
|---|---|---|
| Top zone Temperature °F | 750 to 950 | 740 to 970 |
| Middle Zone Temperature °F | 960 to 1165 | 975 to 1210 |
| Bottom Zone Temperature °F | 1180 to 1650 | 1220 to 1675 |
| Top Zone Residence Time | 15 minutes | 18 minutes |
| Middle Zone Residence Time | 12 minutes | 15 minutes |
| Bottom Zone Residence Time | 25 minutes | 30 minutes |
| Pressure of Reactor | 350 (psia) | 350 (psia) |

In a general manner, while there has been disclosed an effective and efficient embodiment of the invention, it should be well understood that the invention is not limited to such an embodiment as there might be changes made in the arrangement, disposition, and form of the parts without departing from the principle of the present invention as comprehended within the scope of the accompanying claims.

We claim:

1. A method for simultaneously recovering fuel liquids and gases from coal and using the recovered gases for reducing iron ore comprising the steps of forming a slurry of crushed coal, oil and iron ore;

introducing said slurry into the top of a multi-stage vertical reactor tower separated into a top, middle and a bottom zone;

maintaining the pressure within said reactor tower at approximately 350 p.s.i.a.;

extracting liquids from said slurry in said top zone;

passing the solid mixture remaining after extraction of said slurry to said middle zone, gasifying the carbon in said solid mixture to carbon monoxide, simultaneously reducing said iron ore, and effecting slag removal by fluidization; and removing said iron to said bottom zone with any residual carbon, introducing carbon dioxide and carbon monoxide to react with residual carbon and substantially completely reducing the iron ore.

2. The method of claim 1 including the step of introducing an inert, solid particulate material into said slurry to serve as a conveying medium for said slurry through said zones.

3. The method of claim 1 wherein said coal in said middle zone is gasified with air.

4. The method of claim 1 wherein said residual coal in said bottom zone is gasified with carbon dioxide.

5. The method of claim 1 wherein the reduced iron ore in the bottom zone is sintered into substantially pure iron pellets.

6. The method of claim 1 including maintaining the temperature of said top, middle and bottom zones at 750°–950° F, 960°–1165° F and 1180°–1650° F respectively, and maintaining said mixture in said top, middle and bottom zones approximately 15 minutes, 12 minutes and 25 minutes respectively.

7. The method of claim 1 wherein said extracted liquids are removed from said top zone, light distillate products and lean gases are recovered therefrom, said lean gases are desulfurized and subjected to combustion, and carbon dioxide produced thereby recycled to the reactor.

* * * * *